United States Patent [19]
Perry

[11] Patent Number: 5,366,036
[45] Date of Patent: Nov. 22, 1994

[54] POWER STAND-UP AND RECLINING WHEELCHAIR

[76] Inventor: Dale E. Perry, 3915 N. Park Ave., Studio #1, Tucson, Ariz. 85719

[21] Appl. No.: 6,469

[22] Filed: Jan. 21, 1993

[51] Int. Cl.$^5$ .............................................. B60K 1/02
[52] U.S. Cl. ..................... 180/65.1; 180/6.5; 180/907; 280/30; 280/657
[58] Field of Search ............... 180/6.48, 6.5, 65.1, 180/65.5, 65.6, 907; 280/638, 651, 652, 653, 657, 658, 30; 297/DIG. 4

[56] References Cited

U.S. PATENT DOCUMENTS

| | | | |
|---|---|---|---|
| 4,054,319 | 10/1977 | Fogg, Jr. et al. | 297/384 |
| 4,390,076 | 6/1983 | Wier et al. | 297/330 |
| 4,437,537 | 3/1984 | Ausmus | 180/6.5 |
| 4,456,086 | 6/1984 | Wier et al. | 180/907 |
| 4,809,804 | 8/1989 | Houston | 180/65.5 |
| 4,948,156 | 8/1990 | Fortner | 280/304.1 |
| 5,096,008 | 3/1992 | Mankowski | 180/6.5 |

*Primary Examiner*—Richard M. Camby
*Attorney, Agent, or Firm*—Marshall & Melhorn

[57] ABSTRACT

A wheelchair apparatus is provided for selectively positioning the operator from a sitting position to a standing position or a reclining position. The wheelchair apparatus includes a frame for supporting the operator's body in a reclined, sitting, and standing position. A single positioning actuator is used to selectively move the operator in the frame. A programmable controller controls the operation of both the chassis drive motors and the positioning actuator. The frame and chassis components are interconnected to achieve the desired positioning with a minimum number of electro-mechanical components. A sliding back frame is provided to eliminate shear forces on the back of the operator. The foot rest and frame are shifted towards the rear of the wheelchair when the operator is moved to a standing position such that the weight of the operator is over the axis of the large front wheels. The operator is still in a favorable position for access to items in front of the wheelchair, and the stability of the wheelchair is increased. The batteries are mounted on a slidable tray which is mechanically interfaced with the positioning of the main frame for additional weight distribution control. A shock absorber is attached to the back frame to minimize any instability in the back of the apparatus and to provide additional lifting force in the reclining position. A parallel linkage arm is provided for moving the control station to the side of the wheelchair.

11 Claims, 7 Drawing Sheets

POWER STAND-UP AND RECLINING WHEELCHAIR

BACKGROUND OF THE INVENTION

1. Field of the Invention

This invention relates to wheelchairs, and more particularly to a wheelchair which can elevate its occupant from a sitting position to any position up to a normal standing position, at which positions the wheelchair can be move about to enable the occupant to perform useful work. The wheelchair can also move its occupant from a sitting position to a reclining position to facilitate the transfer of the individual from the wheelchair to a bed.

2. Summary of Related Art

Wheelchair design have become quite sophisticated as a result of efforts intended to enable handicapped individuals to have a degree of control over their own movements. In order to help handicapped individuals return to a normal working environment, they must be able to simulate normal mobility and positioning. Thus, powered wheelchairs have incorporated a wide variety of control and safety devices to assist handicapped operators of wheelchairs in achieving relatively independent movement and transportation.

Wheelchairs have been previously developed which are able to manipulate the handicapped person into the upright position. The ability to achieve a standing position provides many medical benefits as well as increased independence and morale. Wheelchairs have been designed to permit the handicapped person to position himself to work at a number of work stations and to remain in a standing position for several hours at a time. Such wheelchairs are deficient for a variety of reasons.

Stability and mobility are the two primary problems in stand-up wheelchairs. Prior art devices were unstable because most of the weight would be placed on the front of the wheelchair when the handicapped person was in the standing position. In the standing position, the user's body typically extends substantially forward and above the center of gravity of the wheelchair, which may cause the individual to fall forward when attempting to stand.

The present devices for achieving proper weight distribution to stabilize the wheelchair are not satisfying the demands of the users. Selective positioning of the individual is difficult and the large size of the wheelchair needed to achieve proper weight distribution is a serious drawback. In addition to the body weight of the handicapped individual, the weight of the batteries used to power the wheelchair weigh up to 100 pounds, which complicates the weight distribution dynamics in changing from a seated or reclined position to a standing position.

Large wheelchairs typically sacrifice mobility and maneuverability in order to overcome the stability problem. Large wheelchairs are difficult to maneuver in close quarters. Since space is often at a premium in both an office and manufacturing location, it is desirable to have a wheelchair that is highly maneuverable. In addition, many stand-up wheelchairs are not ambulatory when the user is in a standing position.

The stand-up wheelchair must also provide sufficient support to the standing user. Handicapped individuals typically have no leg control or use whatsoever. The stand-up wheelchair must support the user's body during the standing process. Achieving the proper support without effecting mobility is generally difficult to accomplish.

A number of stand-up wheel chairs have been developed to provide handicapped individuals with wheelchairs having stand-up capabilities. U.S. Pat. No. 4,054,319 to Fogg, Jr. et al describes a stand-aid wheelchair for supporting handicapped individuals in a standing position. The wheelchair includes an extended chassis with poor maneuverability.

U.S. Pat. Nos. 4,390,076 and 4,456,086 to Wier et al disclose an integrated ambulator and wheelchair to enable a handicapped individual to stand on the ambulator and be separated from the wheelchair for maneuvering in confined spaces. This invention includes a separable walker and a power platform for standing and maneuverability purposes.

U.S. Pat. No. 4,437,537 to Ausmus teaches a stand up motor driven vehicle for use by handicapped individual. The apparatus tilts forward to for retrieving articles. The apparatus does not includes any seating or reclining position.

U.S. Pat. No. 4,809,804 to Houston et al. discloses a combination wheelchair and walker apparatus which moves a handicapped individual between a seated position and an upright position. The apparatus does not have a reclining position.

U.S. Pat. No. 4,948,156 to Fortner shows a standing support apparatus which can be attached to a wheelchair. The individual using the standing support must have sufficient strength to pull himself into an upright position.

U.S. Pat. No. 5,096,008 to Mankowski discloses a wheelchair which includes a main drive for positioning the wheelchair. The seat is rotatable ninety degrees and includes an adjustable foot plate. The handicapped individual can stand at approximately floor level and work at his normal height when supported by the apparatus.

SUMMARY OF THE INVENTION

In accordance with the present invention, there is provided a wheelchair for selectively positioning the operator from a sitting position to a standing position or a reclining position.

The wheelchair apparatus includes a frame means for supporting the operator's body in a reclined, sitting, and standing position. A chassis with front wheel drive is provided for transporting the frame means across the ground. Each of the front drive wheels is equipped with a DC drive motor powered by the 24 volt DC power supply. A positioning means is used to selectively move the operator in the frame. The controller, which includes a programmable computer, is used to control the operation of both the drive means and the positioning means.

An object of the present invention is to provide the operator with improved positioning capabilities and maneuverability. The wheelchair can move the operator from a sitting position to either a reclined or standing position. The ability to recline the back of the wheelchair provides lower extremity pressure relief and eases the transfer of the operator from the wheelchair to a bed. In the standing position, the operator is able to stand and move about freely without assistance. The operators hands and arms are free to perform various tasks from the stand up position. The health benefits from passive standing are well documented in the medical profession.

In addition to positioning, maneuverability is another key object of the present invention. The front wheel drive has a significantly smaller turning radius than the standard rear wheel drive wheelchair. The front wheel drive unit is more responsive when turning corners or traversing bumps or other obstacles in the path of the wheelchair. The increased maneuverability is needed for certain office and production areas where space is at a premium.

A further object of the present invention is to provide an economical wheelchair unit that is easy to maintain. The unique chassis and support frame of the present invention requires only one linear actuator instead of multiple linear actuators to position the seat, the seat back, and the foot rest from a reclined to an upright position. The frame and chassis components of the present invention are interconnected to achieve the desired positioning with a minimum number of electro-mechanical components.

When changing positions in the wheelchair, the seat back may have a tendency to produce a shear force against the back of the wheelchair operator. The shear force pulls on the clothes of the operator and irritates the skin. Another object of the present invention is to provide a sliding back with virtually zero shear.

Weight distribution is an important consideration in achieving the desired center of gravity for the apparatus. In the sitting position, a majority of the weight of the apparatus and operator is over the front axle of the large drive wheels. When the operator reclines, the weight distribution shifts to the back of the wheelchair, where the castor wheels provide the necessary support.

One of the objects of the present invention is to also provide a stable apparatus when the wheelchair operator is standing. If the foot rest was maintained in the front of the wheelchair for both the sitting and standing positions, the weight of the operator, supported substantially by the foot rest in the standing position, would cause the wheelchair to tip forward. To overcome this potential problem, the foot rest and other support frame components are shifted to the rear of the wheelchair when the operator is moved to a standing position such that the weight of the operator is over the axis of the large front wheels. The operator is still in a favorable position for access to items in front of the wheelchair, but the stability of the wheelchair is increased. The batteries for positioning and driving the wheelchair are underneath the seat of the wheelchair. To further improve the weight distribution, the heavy batteries are mounted on a slidable tray which is mechanically interfaced with the positioning of the seat. When the operator is moving to an standing position, the support frame is moved toward the rear of the wheelchair over the large wheel axle, and the battery tray and batteries are moved rearward over the castor wheels. Because the batteries are the heaviest components of the apparatus, the extra weight at the rear of the apparatus counterbalances the additional weight to the front of the apparatus when the operator stands up.

An additional object of the present invention is to improve the stability of the seat back in the standing position and to support the seat back in the reclined position. A shock absorber is attached to the seat back. When the operator is standing, the additional support of the shock absorber minimizes any instability in the back of the apparatus. As the operator reclines, the shock absorber is compressed. When the operator desires to move from the reclined to the sitting position, the shock absorber provides additional lifting force to reduce the amount of forced required for the linear actuator to lift the operator.

A final object of the present invention is to provide a operator's control station which is simple to use and is conveniently positioned for operation. A desirable feature is to have a movable control station which can be rotated out of the way when the operator is working in the front of the wheelchair or when the operator desires to position the wheelchair against a table or desk. The control station pivots to the side and maintains a frontal orientation by using a parallel linkage to move the control station to the side of the wheelchair.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
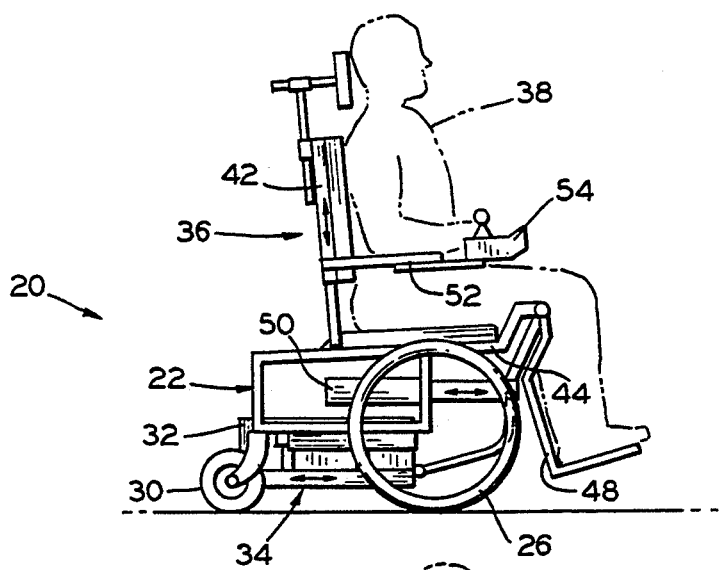
FIG. 1 is a diagrammatic view of the wheelchair apparatus with the operator in a sitting position.
Figure 2:
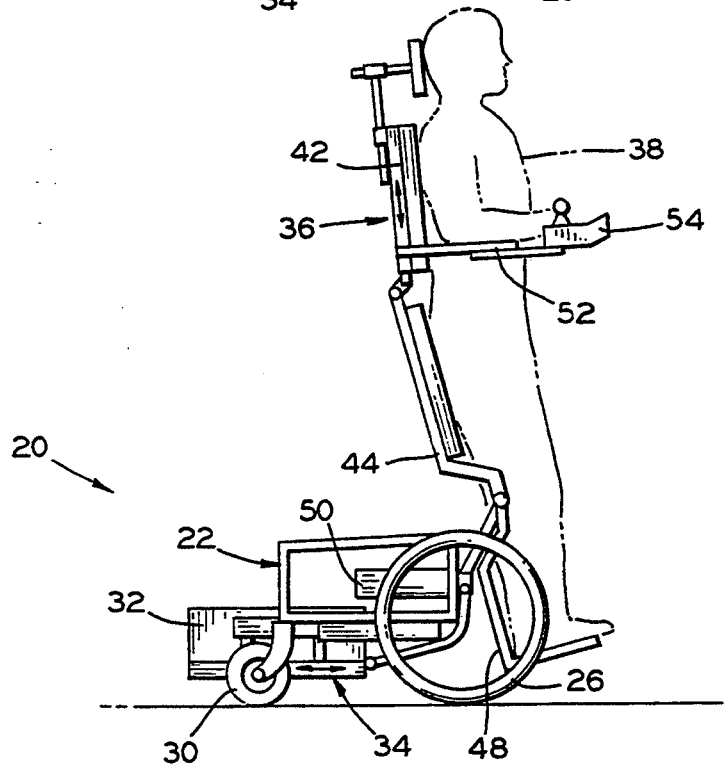
FIG. 2 is a diagrammatic view of the wheelchair apparatus with the operator in a standing position.
Figure 3:
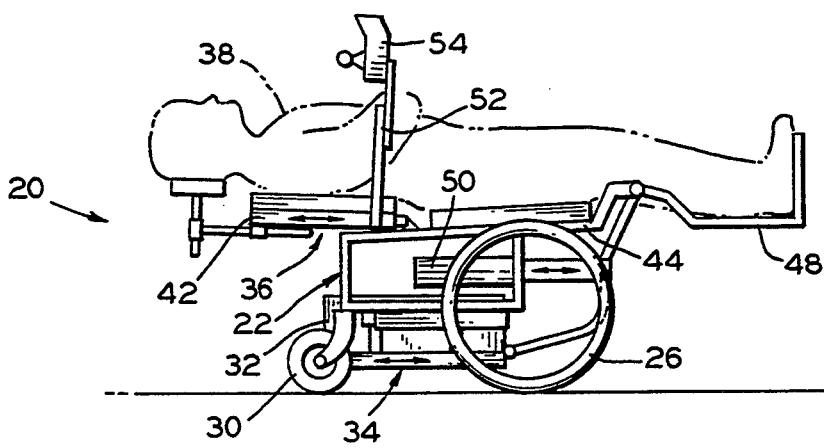
FIG. 3 is a diagrammatic view of the wheelchair apparatus with the operator in a reclining position.
Figure 4:
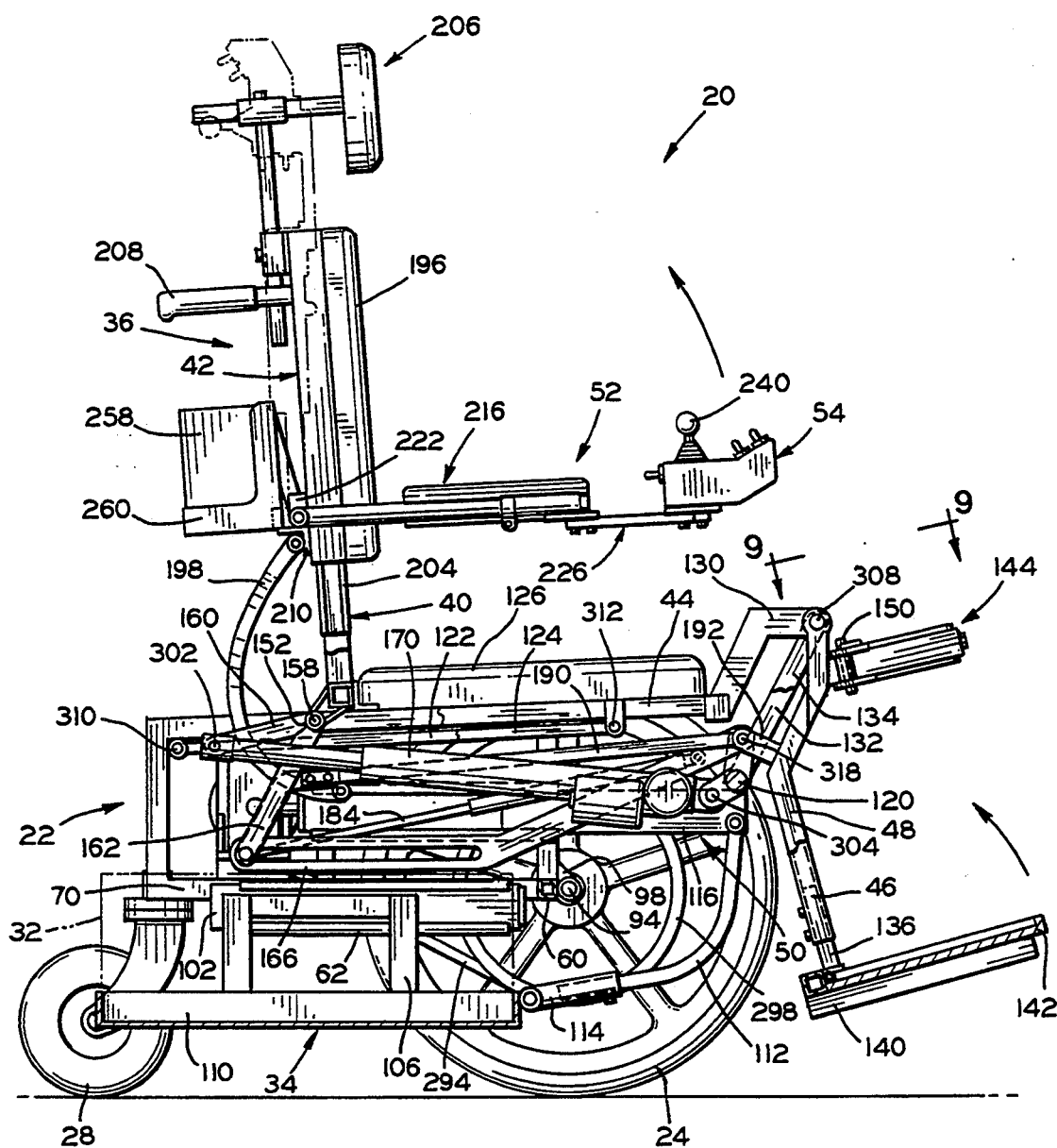
FIG. 4 is a side elevational view, partly in cross section, of the wheelchair apparatus in a sitting position.

Referring now to the drawings, there is shown in FIGS. 1-3 a unique wheelchair 20 with front wheel drive maneuverability which can conveniently be converted from a sitting position to a standing or reclining position. The wheelchair 20 of the present invention includes a chassis 22 having a pair of large, front wheels 24, 26 and a smaller pair of caster-type wheels 28, 30 in the rear. The wheelchair 20 is powered by 24 volt DC batteries 32. The batteries 32 are mounted on a slidable battery frame 34, which is attached to the chassis 22.

The body frame 36 for supporting the operator 38 includes an inner back frame 40 and an outer back frame 42, a seat frame 44, and a pair of foot rest bars 46, 48 which are uniquely linked to support the operator 38 not only in the sitting position as shown in FIG. 1, but also in the full range of positions between the fully reclined position (FIG. 3) to the standing position (FIG. 2).

The inner back frame 40 and the outer back frame 42 are slidably connected to eliminate the shear stresses on the back of the operator 38. The body frame 36 includes a slidable base 50 which shifts the weight of the body frame 36 and the operator 38 to the rear of the wheelchair 20 when the wheelchair 20 is transformed from the sitting position to the standing position.

The wheelchair 20 also includes a unique push-back arm rest 52. The control station 54, mounted on the arm rest 52, provides the operator 38 with control of the speed and direction of the wheelchair 20 plus the positioning of the body frame 36 on the chassis 22. The programmable controller, drive motors, linear actuator and portions of the frame linkages and support were intentionally omitted from the schematic drawings in FIGS. 1-3.

In the sitting position as shown in FIG. 1, the weight of the body frame 36 and operator 38, plus the weight of the batteries 32 are positioned to achieve a center of gravity over the chassis 22 and the front wheels 24, 26. The front wheel drive system of the present invention results in substantially improved maneuverability and smaller turning diameter when compared to the rear-wheel drive systems for wheelchairs. However, the proper weight distribution must be maintained in order to prevent the wheelchair 20 from tipping forward.

Before describing the mechanical linkages and the actuator used to move the operator 38 in the wheelchair 20 from a sitting position to a standing position, it may be beneficial to discuss how the battery frame 34 and the slidable base 50 supporting the body frame 36 are positioned. Instead of simply pushing the back rest forward and pulling the back rest and seat to a vertical alignment, the actuator and mechanical linkages in the present invention cause the body frame 36 to shift towards the rear of the wheelchair 20 by sliding the base 50 supporting the body frame 36 towards the rear of the wheelchair 20 as the operator 38 is moved to a standing position. Without the shifting of the body frame 36, the weight of the operator 38 would be too far forward in the wheelchair 20, which could cause the wheelchair 20 to tip forward.

In addition to shifting the body frame 36 towards the rear of the wheelchair 20, the battery frame 34 supporting the batteries 32 is interlinked to the slidable base 50 and is also shifted toward the rear of the wheelchair 20 as the operator 38 is moved to a standing position. The additional weight over the rear wheels 28, 30 permits the operator to achieve a standing position without any structural components of the wheelchair 20 in front of the operator 38.

When moving from a sitting to a reclining position as shown in FIG. 3, the seat frame 44, slidable base 50, and battery frame 34 remain in the same position. The outer and inner back frames 40, 42 are lowered and the foot rest bars 46, 48 are raised to support the operator 38 in the reclining position.

The two substantially different functions, moving from a sitting to a standing position and moving from a sitting to a reclining position, are accomplished in the wheelchair 20 by utilizing a unique mechanical linkage system and a single actuator. The mechanical linkage and single actuator are less expensive and are more rugged and reliable than wheelchairs with multiple actuators or other linkage systems.

In addition, the front wheel drive system is designed such that the majority of the structural components and drive system components are positioned behind the operator 38, which allows the operator 38 to achieve a more preferred sitting and standing position without wheelchair structural components impeding the operator 38.

Referring now to FIGS. 4-8, the structural components of the wheelchair 20 are shown in detail. The chassis 22 is made of steel bar or other similar material.

Figure 6:
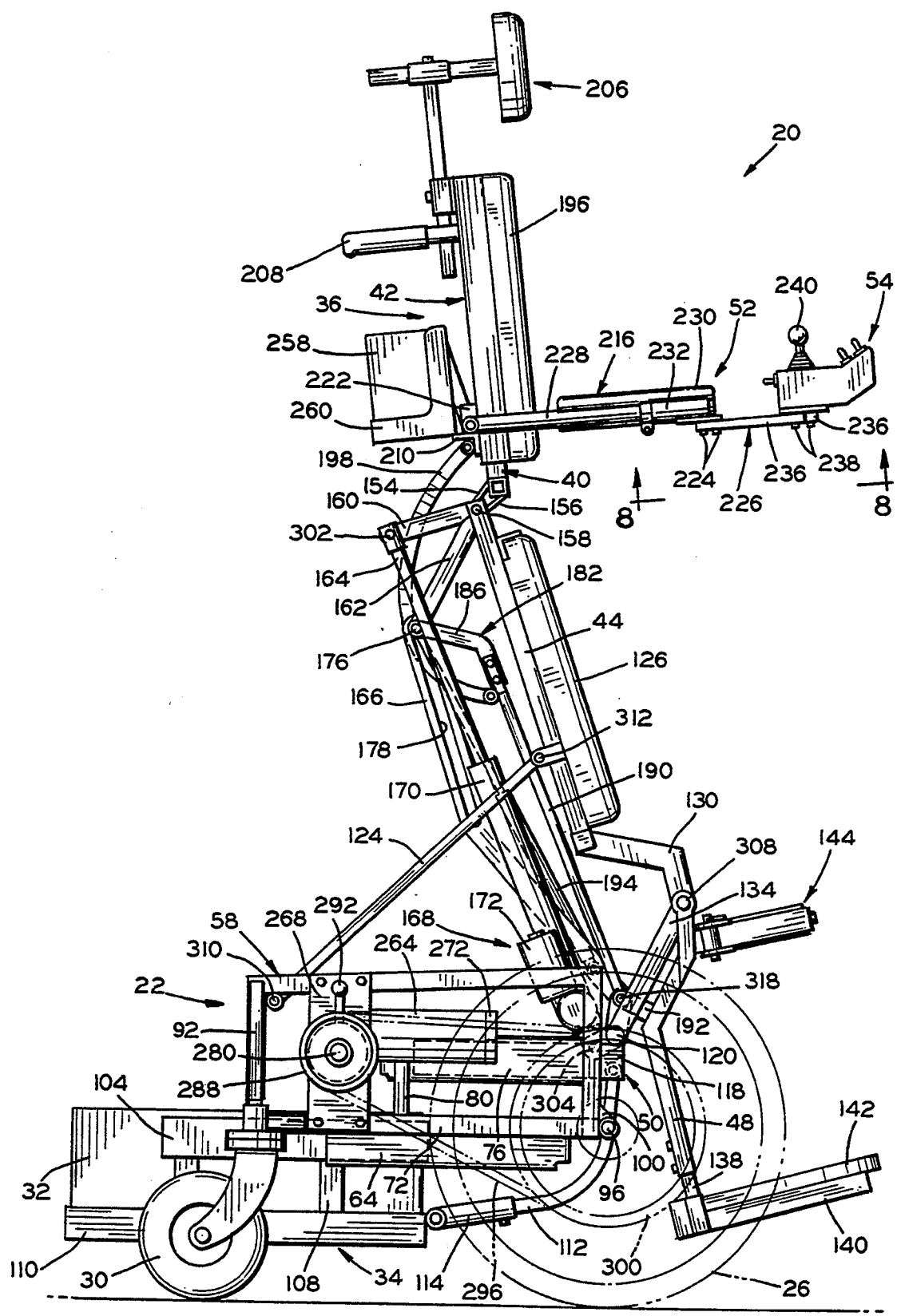
FIG. 6 is a side elevational view of the wheelchair in a standing position.

FIG. 6, which shows the body frame 36 fully extended in the standing position, provides the best view of certain chassis components of the wheelchair 20. The chassis 22 consists primarily of two side members 56, 58 having a generally rectangular shape. At the front end of the rectangular side members 56, 58, a single cross member 60 extends the width of the chassis 22 to connect the lower front corners of the two rectangular side members 56, 58.

Two pairs of slide rail tracks are mounted on the chassis 22. The two lower slide rail tracks 62, 64 are used to shift the position of the battery frame 34. The lower slide rail tracks 62 and 64 are welded to support members 66, 68 extending inward from the lower segments 70, 72 of the chassis side members 56, 58.

The two upper slide rail tracks 74, 76 are used to support the slidable base 50 to which the body frame 36 is attached. The upper slide rail tracks 74, 76 are each supported by angled support arms 78, 80 extending from the lower segments 70, 72 of the chassis side members 56, 58.

At the rear of the wheelchair 20, the chassis 22 is open ended to permit the battery frame 34 to slide past the rear of the chassis 22. Each side of the chassis 22 includes an L-shaped bracket 82, 84 for connecting the wheel frames 86, 88 of the rear wheels 28, 30 to the chassis 22. Angled support arms 90, 92 extend from the L-shaped brackets 82, 84 to the chassis side members 56, 58.

The two large front wheels 24, 26 are connected to the chassis 22 at the chassis cross member 60. The wheels 24, 26 are provided with individual stub axles 94, 96 secured in brackets 98, 100 welded to the chassis cross member 60.

The battery frame 34 includes two slide rails 102, 104 which are mounted in the slide rail tracks 62, 64, respectively. Each slide rail 102, 104 has two support arms 106, 108 extending downward to the battery tray 110. The battery tray 110 provides a surface for mounting two 12-volt DC batteries 32.

The battery frame slide rails 102, 104 are slidably positioned in the slide rail track 62, 64 by a battery frame connector arm 112. The arm 112 is pivotally connected to the front of the battery tray 110 and curves upward to connect to the front end of a slide rail 116 for the slidable base 50. The connector arm 112 is provided with a telescopic bracket 114 for adjusting the length of the connector arm 112. The length of the connector arm 112 determines the distance the battery frame 34 is shifted toward the rear of the wheelchair 20 when the operator 38 is moved to a standing position. Heavier operators 38 require the longest arm 112 for a longer shift distance to achieve the desired weight balance.

The slidable base 50, which supports the body frame 36, consists of two steel plate side rails 116, 118 slidably mounted in the upper slide track 74, 76 connected to the chassis 22. The slide rails 116, 118 are welded to the main cross bar member 120, which is made of steel or other similar material. This single cross bar 120 supports all of the structural components of the body frame 36.

The chassis 22 is provided with two body frame support arms 122, 124 pivotably connected to the back, upper corner of the chassis side members 56, 58. The support arms 122, 124 extend from the chassis side members 56, 58 to the seat frame 44, which is part of the body frame 36. The two support arms 122, 124 assist in positioning the seat frame 44 and back frames 40, 42 as the operator 38 is moved from a sitting position to a standing position.

The seat frame 44 is rectangular in shape and is made from steel bar. A seat cushion 126 is attached to the seat frame 44. Two seat link arms 128, 130 are welded to the front corners of the seat frame 44. The seat link arms 128, 130 extend from the seat frame 44 at an angle and include an angled segment which is pivotably connected to the foot rest bars 46, 48. Frame support bars 132, 134 are important structural members at the front end of the seat frame 44. One end of the support bars 132, 134 is welded to the main cross bar 120 and the other end is welded to the seat link arms 128, 130. As shown in FIG. 6, the support bars 132, 134 must support a substantial portion of the weight of the operator 38 in the standing position. The support bars 132, 134 are also essential for sliding the slidable base 50 when the weight is shifted to the rear of the chassis 22.

The two foot rest bars 46, 48 telescopically receive the stubs 136, 138 of the foot rest bracket 140. The foot rest plate 142 is pivotally connected to the foot rest bracket 140. The telescopic adjustment can be used to change the length of the foot rest bars 46, 48. The foot rest plate 142 pivots to a vertical position to allow the operator to perform a standing pivot, if necessary, when transferring to and from the wheelchair. The bracket 140 and plate 142 support the feet of the operator 38 when the operator 38 is reclined.

Figure 9:
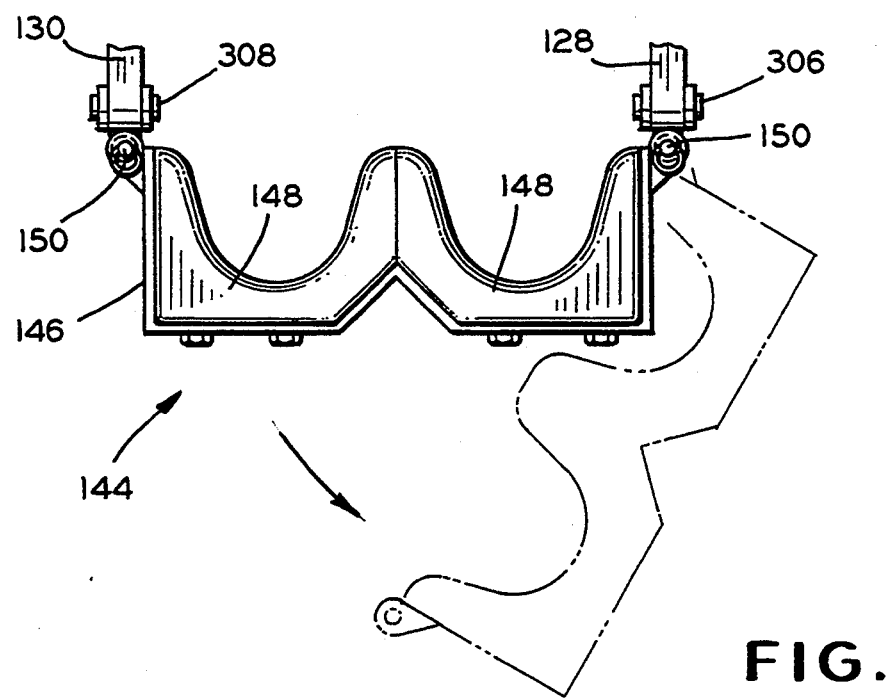
FIG. 9 is a top plan view of the knee lock piece at the front of the wheelchair taken in the direction of line 9—9 of FIG. 4.

The knee lock support 144, as shown in FIG. 9, is connected to the upper portion of the foot rest bars 46, 48 and secured by pins 150. The support 144 includes a steel outer frame 146 and a large inner pad 148 to engage the knees of the operator 38 and keep the knees locked when the operator 38 is standing.

At the back end of the seat frame 44, a seat pivot bar 152 extends between the two side edges of the seat frame 44. Two set off plates 154, 156 are welded to the seat pivot bar 152 and the inner back frame 40. The inner back frame 40 pivots about pivot points 158 at the outer ends of the seat pivot bar 152.

Welded to the mid range of the seat pivot bar 152 are two heavy duty link segments, an actuator link segment 160 to connect the seat pivot bar 152 to the end of the actuator arm 164 and a positioning link segment 162 to connect the seat pivot bar to the slotted link arm 166.

The actuator drive 168 consists of an actuator cylinder 170, DC motor 172, and gear box 173 pivotably mounted on a lower bracket 174 welded to the main cross bar 120. Power cables (not shown) connect the actuator motor 172 to the batteries 32 to provide DC power. The actuator arm 164 extending from the actuator cylinder 170 is connected to the actuator link segment 160.

The positioning link segment 162 is linked to the slotted link arm 166 by a pin 176 extending through the slot 178. The slotted link arm 166 is a flat, steel segment provided with a bend in the approximate center of the link arm 166 to achieve the desired mechanical movement of the body frame 36. The slot 178 extends from the end of the link arm 166 adjacent the positioning link segment 162 to approximately the bend in the link arm 166. The solid end of the slotted link arm 166 is pivotably connected to an upper bracket 180 welded to the main cross bar 120.

The slot link pin 176, in addition to linking the positioning link segment 162 to the slotted link arm 166, is also connected to two other members, the leg link segment 182 and the shock absorber arm 184. The leg link segment 182 is a Y-shaped unit having a main body 186 and two arms 188, 190 extending from the main body 186 to link segments 192 welded to foot rest bars 46, 48.

The wheelchair 20 of the present invention includes a shock absorber 194 with a shock absorber arm 184 pivotably connected to the link pin 176. The base of the shock absorber 194 is pivotably attached to the slotted link arm 166 adjacent the main cross bar 120. The shock absorber 194 serves two main functions. The shock absorber arm 184 is extended as the operator 38 is moved into a standing position. The shock absorber 194 helps to stabilize the body frame 36, and specifically the inner back frame 40, which prevents unwanted movement or flexing of the body frame 36.

When the wheelchair 20 is moved to a reclining position, the shock absorber arm 184 is compressed as the inner and outer back frames 40, 42 are lowered. When the operator 38 desires to move the wheelchair 20 to a sitting position, the shock absorber 194, with the compressed shock absorber arm 184, provides a substantial portion of the force to lift the back frames 40, 42 to a sitting position. This substantially reduces the actuator rating required to initiate the movement from a reclining to a sitting position. The same shock absorber 194 is used for stabilizing the back frames 40, 42 in the standing position and providing additional force to raise the back frames 40, 42 from a reclining position to a sitting position.

The back cushion 196 is supported by an inner back frame 40 and an outer back frame 42. The lower edge of inner frame 40 is connected to the seat pivot bar 152 by set off plates 154, 156. The set off plates 154, 156 are welded to both the inner back frame 40 and the seat pivot bar 152. The actuator link segment 160 is also welded to the seat pivot bar 152. As the link segment 160 is positioned by the actuator arm 164, the pivot bar 152 causes the inner back 40 to pivot about pivot points 158. The angle between the link segment 160 and the set off plates 154, 156 remains constant in all the positions.

In order to reduce the shear forces on the back of the operator 38, the outer back frame 42 includes rails 203 on the inner surface of the two sides 200 of the frame 42 for slidably mounting the frame 42 on the track 204 on the outer surface of the two sides 202 of the inner back frame 40. The back rest link arm 198 determines the position of the outer back frame 42 in relation to the inner back rest 40. The back rest link arm 198 positions the outer frame 42 so that the relationship between the seat cushion 126 and the back cushion 196 remain in the same spaced relationship as the body parts of the operator 38. This reduces the shear forces on the back of the operator 38.

An adjustable head rest 206 is connected to the outer back frame 42 and supports the head of the operator 38. Standard handles 208 for pushing or pulling the wheelchair 20 are also attached to the outer frame 42. For an operator 38 requiring upper body support, a chest strap or shoulder harness (not shown) are secured to the outer back frame 42. The chest strap or shoulder harness keeps the upper body of the operator 38 resting comfortably against the back cushion 196. It also prevents the operator 38 from falling forward in a sitting or standing position. A variety of chest straps and shoulder harnesses are known in the industry.

The outer back frame 42 includes an angle-iron cross bar 210 welded to the outer frame 42. The cross bar 210 retains the inner frame and includes a pivot mounting bracket 212 for connecting the back rest link arm 198 to the outer frame 42. The cross bar 210 is also used to support the mounting for the two arm rests 214, 216. The arm rests 214, 216 are pivotable about the two mounting bolt brackets 218, 220. A lug 222 is welded to each arm rests 214, 216 adjacent the mounting bracket 212. The lug 222 limits the vertical rotation of the arm rest to 90°.

In the standard horizontal position, the arm rests 214, 216 extend perpendicular to the outer back frame 42 and the two lugs 222 engage the frame 42. The arm rests 214, 216 may be raised to permit side access to and from the wheelchair 20. The lug 222, after the arm rest has been rotated 90°, engages the cross bar 210, thereby limiting the vertical rotation to 90°. The arm rests 214, 216 remain in the vertical position until lowered for standard operation.

When the arm rests 214, 216 are in the standard, horizontal position, the arm rests often present positioning problems for the operator 38. In a sitting position, the arms rests 214, 216 may prevent the operator 38 from positioning the wheelchair 20 at a table or work bench. When the operator 38 is in a standing position, the arm rests 214, 216 often interfere with the range of movement of the operator to reach items from a standing position. The arm rests 214, 216 may be raised to a vertical position, but this is often difficult for the operator 38 to do, and eliminates the use of the control station 54 for positioning the wheelchair 20.

Figure 8:
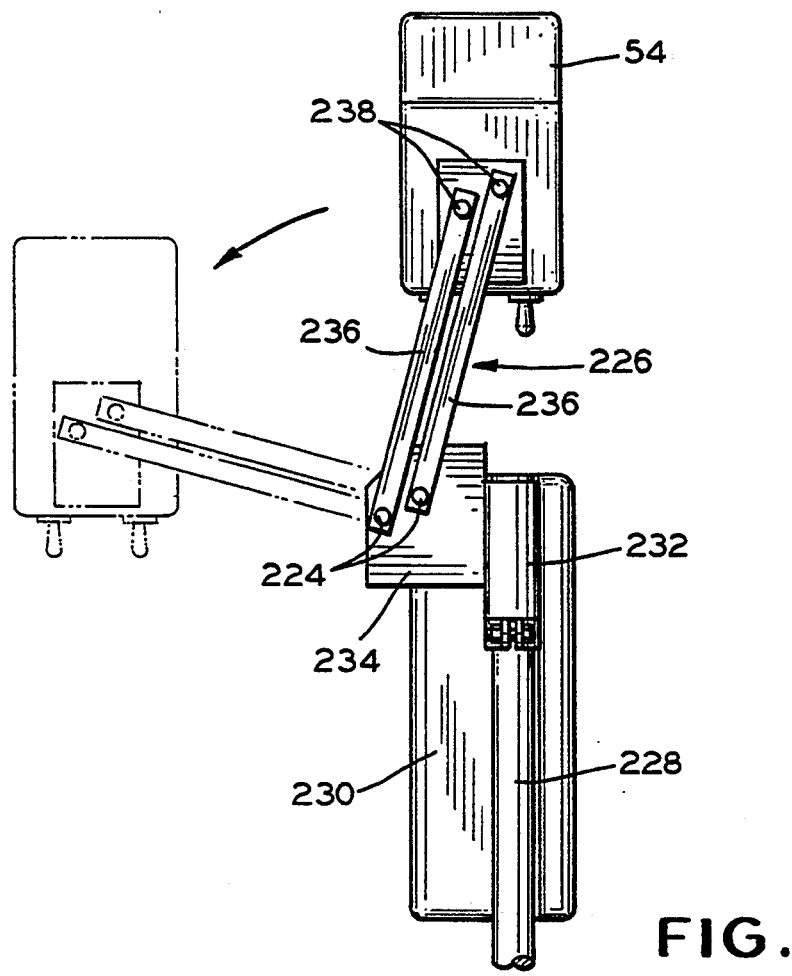
FIG. 8 is a bottom plan view of the control arm of the wheelchair taken in the direction of line 8—8 of FIG. 6.

Arm rest 216 includes a center pivot point 224 with a parallel linkage segment 226 which pivots in a horizontal motion to the side of the wheelchair 20. The other arm rest 214 may be similarly constructed. FIG. 8 shows a bottom view of the arm rest 216. A tubular segment 228 extends from outer back rest 42. The arm rest cushion 230 is affixed to the tubular segment 228. An adjustment bracket 232 with mounting pad 234 is provided to permit the operator to adjust the length of the arm rest 216 by sliding the bracket 232 on the tubular segment 228.

The parallel linkage segment 226 is pivotably connected to pad 234 and includes two parallel bars 236 with offset pivot points 224 on the pad 234 and offset pivot points 238 on the control station 54. The control station 54 may be pivoted to the outside of the arm rest 216 by simply pushing the control station 54 in that direction. Pivoting the control station 54 to the side of the wheelchair 20 and then back into a fully extended position does not require any manual dexterity or adjustment of any structural component.

The control station 54 remains in operation and oriented in the same forward position throughout the range of pivotal movement. The adjacent pivot points 224 on the pad 234 and the pivot points 238 on the control station 54 are offset as shown in FIG. 8. As the control station 54 is rotated to the outside, the parallel bars 236 and the four pivot points keep the control station 54 in the same orientation. As a result, the joy stick 240 in the control station 54 operates in the same functional manner. No matter where the control station 54 is positioned in the horizontal plane, pushing the joy stick 240 to the left will move the wheelchair 20 to the left.

Figure 10:
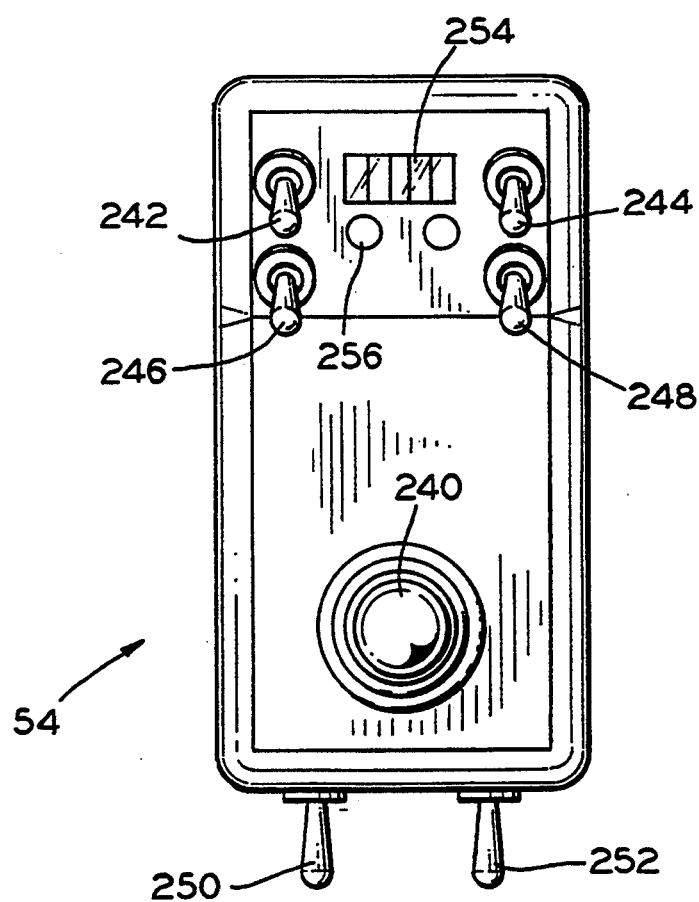
FIG. 10 is a top plan view of the control station.

The typical control station 54, as shown in FIG. 10, includes six (6) two-position switches for selecting various operational modes. Four of the two-position switches are mounted on the upper face of the control station 54. These switches include the following functions: electric horn 242, chair power on/off 244, and speed-control 246, 248. The controller 258 may be programmed for four different speeds of travel, and the switches 246, 248 determine which speed is selected.

The two switches at the end of the control station 54 control the actuator motor 172. One of the switches 250 is for power on/power off, and the second switch 252 is for controlling the direction of movement of the actuator arm 164. For controlling the actuator arm 164, the direction of the actuator arm is selected on switch 252 and then the power switch 250 is momentarily turned on until the chair reaches the desired position. The power switch 250 is a double pole, double throw switch, and the motor leads are shorted when the switch is in the off position. In an alternative configuration, the actuator power on and off switch 250 remains a two-position switch and the directional switch may be change to a three-position switch for up, center-off, and down operation. In such a case, the three-position switch would be used to position the height of the frame of the wheelchair. The on/off power switch 250 for the actuator provides dynamic braking when the switch 250 is turned off, which immediately stops and retains the position of the frame 36.

The control station 54 is also provided with an indicating light 254 to show the available charge and a power charging mode light 256 to indicate when the batteries are being charged. The joy stick 240 is a standard joy stick operator and provides proportional steering and speed control.

The programmable controller 258 is mounted on the angle-iron cross bar 210 of the outer back frame 42. An L-shaped bracket structure 260 is welded to the cross bar 210 to hold the controller 258. The controller 258 is programmable and the operation of the wheelchair 20 may be customized to meet the specific requirements of the operator 38.

The wiring harness (not shown) for the wheelchair 20 of the present invention is a standard form of wiring harness for conducting power from the batteries 32 to the controller 258, the drive motors 262, 264, and the actuator motor 172; and for transmitting control signals from the control station 54 to the controller 258, and from the controller 258 to the drive motors 262, 264 and actuator motor 172. The wiring harness is secured to the battery frame connector arm 112, the leg link arm 188, and the back rest link arm 198. Control wires are secured to the underside of the arm rest 216 for the control station 54. The wires are flexible to accommodate the vertical and horizontal movement of the body frame 36 and the arm rest 216.

Figure 5:
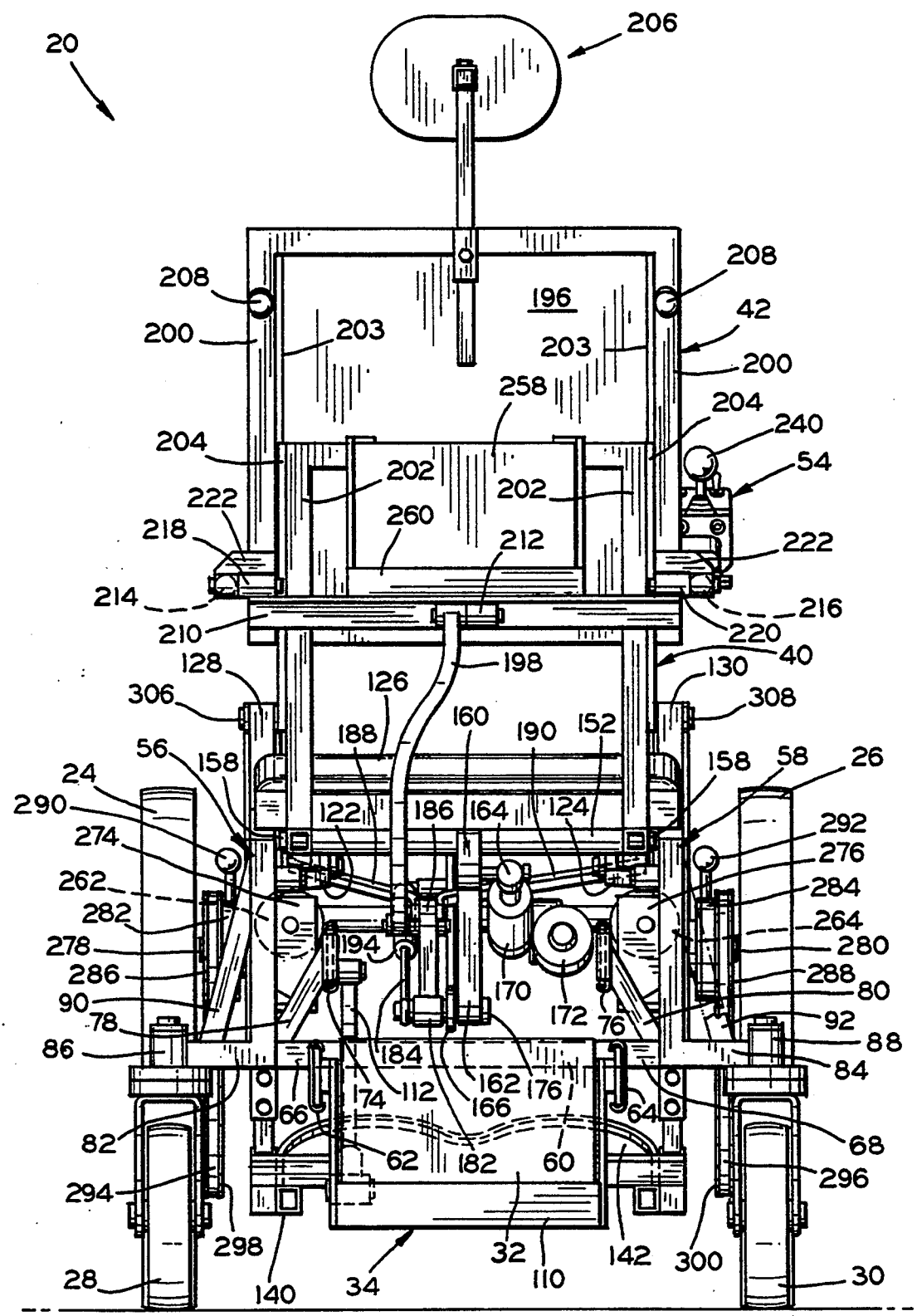
FIG. 5 is a rear elevational view of the wheelchair apparatus.

As best shown in FIGS. 5 and 6, independent DC drive motors 262, 264 are mounted on the side frames of the chassis to supply power to the front wheels 24, 26. Individual mounting plates 266, 268 for the left wheel drive motor and right wheel drive motor are welded to the chassis 22. The motors 262, 264 are mounted on the inside of the mounting plates 266, 268 and are provided with a brake 272 at one end of the motor 262, 264 and a gear head 274, 276 at the other end. Each gear head includes an output shaft 278, 280 connected to a clutch 282, 284 and a small pulley wheel 286, 288 mounted on the mounting plates 266, 268. Each clutch 282, 284 includes a clutch handle 290, 292 to engage or disengage the clutch 282, 284.

The present invention is a belt drive unit, with pulley belts 294, 296 connecting the small pulley wheels 286, 288 to the respective large pulley wheels 298, 300 mounted on the large front wheels 24, 26. The DC drive motors 262, 264 are positioned in the middle of the chassis 22 to more evenly balance the weight and permit the use of front wheel drive.

The front wheel drive wheelchair 20 has a significantly smaller turning radius than a rear wheel drive unit. This permits wheelchair 20 of the present invention to maneuver in smaller places than a rear wheel drive wheelchair. The front wheel drive wheelchair 20 can also turn more sharply, which permits turning of corners without having to maneuver the corner in a rounded manner.

In operation, the power switch 244 for the drive motors is positioned in the on position and the speed switches are selected. The joy stick 240 provides proportional steering and speed control. Signals are sent from the joy stick 240 to the controller 258 and then to the two drive motors 262, 264.

The majority of the drive motor operation will occur when the operator 38 is in the sitting position. In the standing position, the joy stick 240 is still operational to permit the operator 38 to position the wheelchair 20 in the desired location.

The operator 38 may utilize the parallel linkage 226 of arm rest 216 when positioning the wheelchair 20 in a standing or sitting position. From a sitting position, the operator 38 may be able to guide the wheelchair 20 under a table or workbench by pivoting the arm rest 216 to the side of the wheelchair 20. In a standing position, the operator 38 may also pivot the arm to move closer to a chalk board, an easel, or a work station. Since there are no wheels, chassis components, or arm rests extending significantly beyond the operator 38 in a standing position, the operator 38 in the present invention is able to position himself much closer to objects than operators of other stand-up wheelchairs.

In the present invention, the chassis 22 and body frame 36 are behind the operator 38 when the operator 38 is in a standing position. This provides the operator 38 with a more normal sense or perception of standing. The increased maneuverability facilitates the positioning of the wheelchair 20 and operator 38 in small space areas, such as a desk or assembly line station.

When moving the body frame 36 from a sitting position to a standing or reclining position, the control station switches 250, 252 are used to energize the actuator drive 168 and cause the body frame 36 to move. The actuator arm 164 is positioned at approximately the midpoint of its operational range of movement. The actuator arm 164 is extended to achieve the standing position and is retracted to achieve the reclining position.

The main linkages involved in moving the seat frame 44 from a sitting to a standing position are the actuator arm 164 having pivot point 302 at one end; the actuator drive 168 having pivot point 306 at the other end; the actuator link segment 160 and positioning link segment 162 welded to the seat pivot bar 152, which includes pivot points 158; the seat frame 44 extending from pivot points 158 and including angled seat link arms 128, 130; and the foot rest bars 46, 48 which are pivotably connected to the angled seat link arms 128, 130 at pivot points 306, 308.

In positioning the seat frame 44 to a standing position, the actuator pivot points are located at 302, 304 and the seat rest pivot points are located at 158 and 306, 308. When moving to a standing position, the actuator arm 164 is extended at a slightly upward angle. The body frame support arms 122, 124 prevent the body frame 36 from moving directly in the direction of movement of the actuator arm 164. The actuator arm 164 pivots about the pivot point 302 and the body frame support arms 122, 124 pivot about the pivot points 310 at the rear end of the chassis on one end and about pivot points 312 on seat frame 44 at the other end.

As the actuator arm 164 continues to extend, the back end of the seat frame 44 begins to rise off of the chassis 22 and the front end of the seat frame 44 begins to pivot about the foot rest pivot points 306, 308. As the back end of the seat frame 44 rises, additional weight is supported by the frame support bars 130, 132.

The extension of the actuator arm 164 and upward movement of the back of the seat frame 44 causes the complete body frame 36 to shift towards the rear of the wheelchair 20. The movement of the seat frame 44 causes the support arms 122, 124 to pivot about the pivot points 310 on the chassis 22 and pivot points 312 on the frame 44. As the seat frame 44 moves upward, the support arms 122, 124 create a force in the rearward direction which is transferred through the seat frame 44, the seat link arms 128, 130 and the frame support bars 132, 134 to slide the seat frame 50 and the battery frame 34 towards the rear of the chassis 22.

Figure 7:
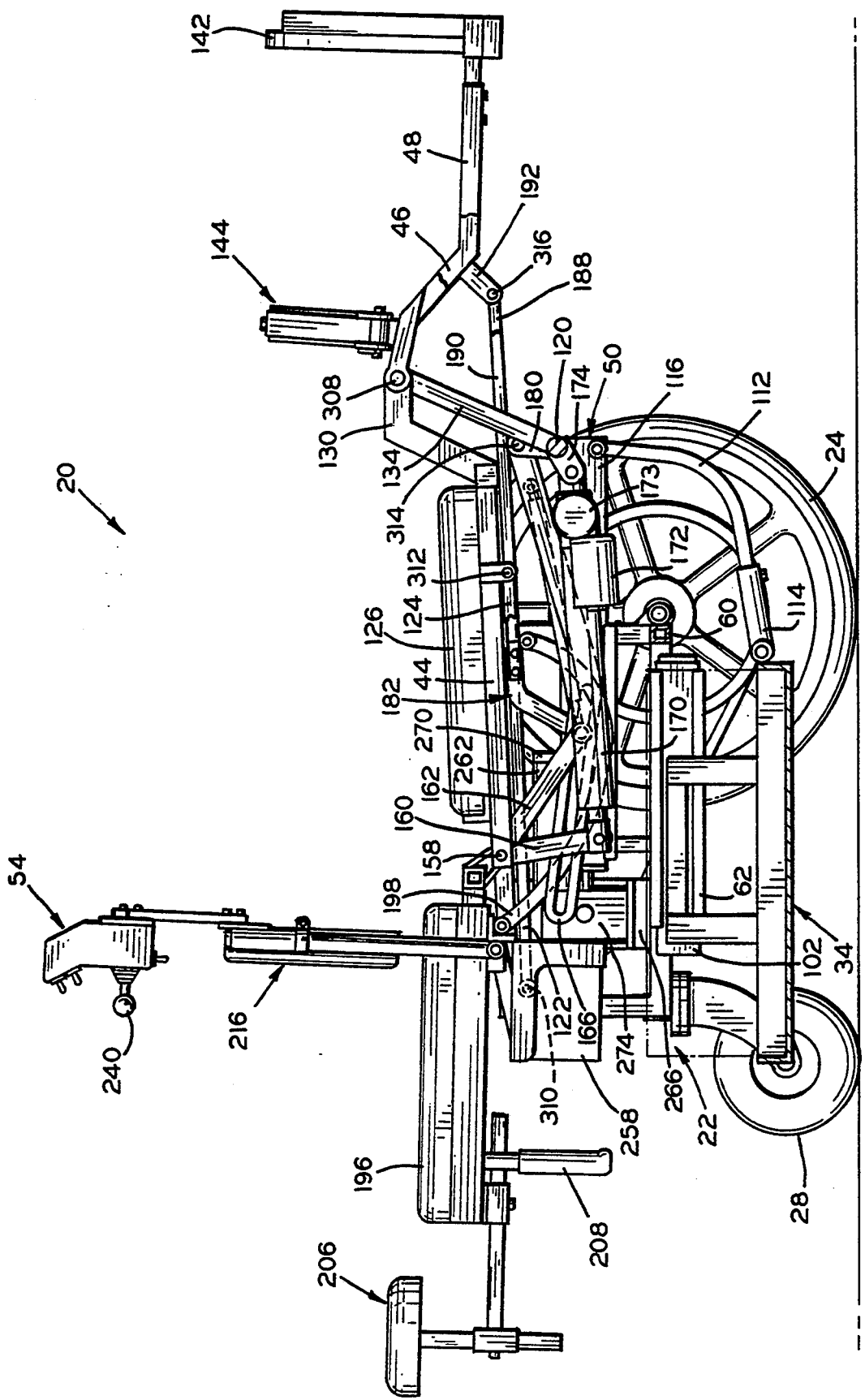
FIG. 7 is a side elevational view of the wheelchair in a reclining position.

The positioning link segment 162 is welded to the same seat pivot bar 152 as the actuator link segment 160. When the seat frame 44 and seat pivot bar 152 are repositioned by movement of the link segment 160 by the actuator arm 164, the positioning link segment 162 moves the slotted link arm 166 by pulling link pin 176 at the outer end of the slot 178 of the link arm 166. The link arm 166 also pivots about pivot point 314, as shown in FIG. 7, in the upper bracket 180 attached to the main cross bar 120. The link pin 176 in the slot 178 of the slotted link arm 166 is located at the outer end of the slot 178 when the body frame 36 is in a sitting position. The link pin 176 remains in such a position as the wheelchair 20 is moved to a standing position and the positioning link segment 162 draws the slotted link arm 166 into a vertical position.

The shifting of the weight of the body frame 36 and operator 38 towards the rear of the chassis 22 provides superior balance to the operator 38 in the standing position without any support members or other structural components at the front end of the chassis 22. When the actuator arm 164 is fully extended, the slide base 50 supporting the body frame 36 has reached the end of the slide track 74, 76 and has effectively shifted the weight of the operator 38 and body frame 36 approximately 8 to 12 inches towards the rear of the wheelchair 20.

As the slide base 50 is shifted towards the rear of the chassis 22 when the body frame 36 is moved to a standing position, the connector arm 112 causes the battery frame 34 to slide towards the rear of the chassis 22 on the battery slide track 62, 64. The connector arm 112 is telescopically adjustable so that the spacing between the battery frame 34 and the body frame 36 can be changed. Consequently, the distance shifted by the battery frame 34 can be adjusted to provide the desired weight distribution and balance. For a heavy operator, the connector arm 112 would be fully extended to shift the weight of the batteries 32 as far as possible to the rear of the chassis 22 to balance the weight of the operator 38. To achieve the desired weight distribution for a lighter operator, the distance shifted by the batteries 32 can be decreased by reducing the length of the connector arm 112.

In addition to shifting the weight of the body frame 36 (with operator 38) and the battery frame 34 (with batteries 32), the extension of the actuator arm 164 and the movement of the slotted link arm 166 also effects the foot rest bars 46, 48 and the back frames 40, 42. The link pin 176 in the slot 178 is pivotably connected to the positioning link segment 162 plus the Y-shaped leg link segment 182. The movement of the positioning link segment 162 as the actuator arm 164 is extended causes the Y-shaped leg link segment 182 to position the foot rest bars 46, 48 in proper alignment with the seat frame 44 for the standing position. The arms 188, 190 of the leg link segment 182 pivot about the pivot points 306, 308 for the angled seat link arms 128, 130 and pull the foot rest plate 142 back towards the chassis 22 of the wheelchair 20.

The back rest link arm 198 has one end pivotably connected to the body 186 of the Y-shaped leg link segment 182 and the other end to the angle-iron cross bar 210 on the outer back frame 42. The actuator link segment 160 is welded to the seat pivot bar 152 of the inner back rest 40. As the actuator link segment 160 raises the back end of the seat frame 44 and the inner back rest 40, the angle of the back frames 40, 42 to the seat frame 44, and the position of the back cushion 196 attached to the outer back frame 42, are controlled by the back rest link arm 198. The outer back frame 42 slides lower on the inner frame 40 as the wheelchair 20 is moved to a standing position. The length and curve of the back rest link arm 198 can be designed specifically for the operator 38 such that the sheer forces which occur when changing positions are effectively eliminated.

The shock absorber 194 helps stabilized the back frames 40, 42 in the standing position.

To move from a standing to a sitting position, the actuator switches 250, 252 are used to retract the actuator arm 164 to its original starting position at the approximate midpoint of the actuator range. As the actuator arm 164 is retracting, the body frame 36 and battery frame 34 are moved back towards the front of the wheelchair 20. The body frame 36 is pulled down to a sitting position. The link pin 176 in the slot 178 of the slotted link arm 166 remains at the outer end of the slot 178.

To move from a sitting position to a reclining position, the actuator switches 250, 252 are used to fully retract the actuator arm 164. As the actuator arm 164 is being retracted, the seat frame 44 does not move because the actuator arm 164 causes the positioning link segment 162 to move the link pin 176 from the outer end of the slot 178 to the inner end of the slot 178. Thus, the slot 178 and link pin 176 facilitate the movement of other linkages without having to move the slotted link arm 166 or reposition the seat frame 44.

As the link pin 176 slides from one end of the slot 178 to the other end, the Y-shaped leg linkage 182 causes the foot rest bars 46, 48 to be pushed to approximately the same plane as the seat frame 44. The arms 188, 190 of the Y-shaped link segment 182 pivot about pivot point brackets 316, 318 at the end of the arms 188, 190. The arms 188, 190 are moved towards the front of the wheelchair 20 as the actuator arm 164 is retracted. The arms 188, 190 pivot about bracket pivot points 316, 318 to achieve the generally horizontal planar position.

The movement of the Y-shaped foot rest link segment 182 controls the movement of the back rest link arm 198. As the arms 188, 190 are moved forward, the back rest link arm 198 causes the outer frame 42 to slide on the inner frame 40 to eliminate the shear forces on the back of the operator 38.

The process is reversed for moving the wheelchair 20 from a reclining position to a sitting position. The actuator arm 164 is extended to approximately the mid range of the actuator drive 168. The link pin 176 in the slot 178 slides from the center of the slotted link arm 166 to the outer end of the slot 178. The seat frame 44 remains in the same position, but the movement of the slot 176 and the Y-shaped leg link segment 182 causes the foot rest bars 46, 48 to be pulled down to the sitting position and the back frames 40, 42 to be directed to a sitting position.

The shock absorber 194 is also attached to the link pin 176 in the slot 178. The shock absorber 194 is compressed when the link pin 176 is moved towards the middle of the slotted link arm 166. When the operator 38 desires to move from a reclining position to a sitting position, the compressed shock absorber 194 provides power to help lift the back frames 40, 42 and the operator 38. The movement from the reclining to the sitting position is the greatest torque requirement for the actuator drive 168. The shock absorber 194 reduces the required actuator drive output rating for moving the link pin 176 in the slot to raise the back frames 40, 42. The useful life of the actuator drive 168 should also be increased because of the reduced output requirements.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wheelchair apparatus having a front and a rear, said wheelchair apparatus comprising:

a) frame means for supporting an operator in a substantially reclining position, a sitting position, and a substantially standing position;

b) chassis means for supporting said frame means above a ground surface for movement therealong said frame means connected to said chassis means to form a front, a rear and a body of the wheelchair apparatus;

c) positioning means, mounted on said frame means and connected to said chassis means, for selectively moving said frame means from the sitting position to the substantially standing position and for selectively moving said frame means from the sitting position to the substantially reclining position;

d) drive means, mounted on said chassis means, for selectively moving the wheelchair apparatus over the ground surface;

e) control means for controlling said positioning means and said drive means, said control means being mounted on said frame means and in communication with said positioning means and said drive means; and f) a weight distribution means for adjusting a center of gravity of the wheelchair with operator, said weight distribution means being slidably attached to said chassis means and linked to said frame means, said weight distribution means simultaneously shifting said frame means for supporting said operator towards the rear of the wheelchair apparatus when said frame means and operator are moved from the sitting position into the substantially standing position and simultaneously shifted towards the front of the wheelchair apparatus when said frame means and operator are moved from the substantially standing position to the sitting position.

2. The wheelchair apparatus defined in claim 1 wherein said weight distribution means includes a slidable battery support means for supporting a set of batteries used to power said drive means and said positioning means, whereby the battery support means shifts the batteries towards the rear of the wheelchair apparatus when said frame means and operator are moved from the sitting position into the substantially standing position and towards the front of the wheelchair apparatus when said frame means and operator are moved from the substantially standing position to the sitting position.

3. The wheelchair apparatus defined in claim 1 wherein said weight distribution means includes a chair base for slidably positioning said frame means on said chassis, the chair base being slidably attached to the chassis and connected to the positioning means, whereby the chair base shifts said frame means toward the rear of the wheelchair apparatus as said frame means is moved from the sitting position to the standing position, and the chair base shifts said frame means toward the front of the wheelchair apparatus as said frame means is returned to the sitting position.

4. The wheelchair apparatus defined in claim 3 wherein said weight distribution means includes a battery support means slidably attached to said chassis and linked to the chair base, whereby the shifting of the chair base and said frame means by said positioning means causes the battery support means to be shifted concurrently.

5. The wheelchair apparatus defined in claim 4 including an adjustable linkage connected between chair base and the battery support means for adjusting the positioning of the battery support means in relationship to the chair base.

6. The wheelchair apparatus defined in claim 4 wherein the chair base and the battery support means are mounted on said chassis by slide rails.

7. The wheelchair apparatus defined in claim 1 wherein said drive means includes a pair of drive wheels mounted on said chassis means on opposite sides of the body of the wheelchair apparatus and a pair of caster wheels mounted on said chassis means at the rear of the wheelchair apparatus.

8. The wheelchair apparatus defined in claim 7 wherein said drive means includes a pair of DC motors, each motor connected to a corresponding drive wheel.

9. A wheelchair apparatus defined in claim 1 wherein said control means includes a programmable controller mounted on said frame means and connected to said positioning means and said drive mean for controlling the movement of said chassis means and the positioning of said frame means.

10. A wheelchair apparatus defined in claim 9 wherein said control means includes a control station for signalling the programmable controller to control movement and positioning of the wheelchair.

11. A wheelchair apparatus defined in claim 10 including a safety switch on said operator station for dynamically braking said positioning means to limit the movement of said frame means.

* * * * *